July 25, 1967 E. F. WARD ETAL 3,333,126
INDUCED VAPORIZATION COOLING OF ROTARY ELECTRICAL MACHINES
Original Filed Jan. 7, 1963 4 Sheets-Sheet 1

ELMER F. WARD
RICHARD N. RIGNEY
RICHARD R. TRACY
INVENTORS.

BY White & Haefliger
ATTORNEYS.

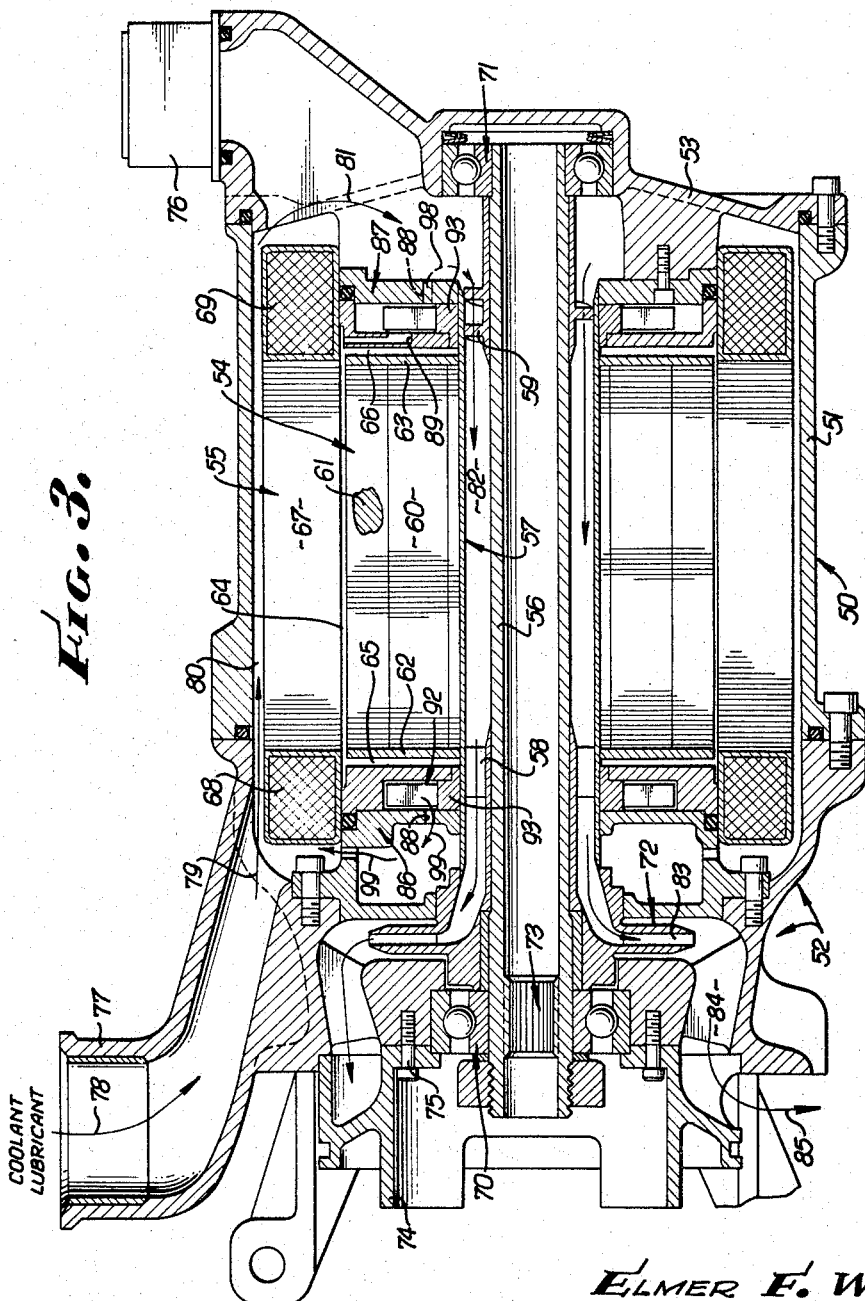

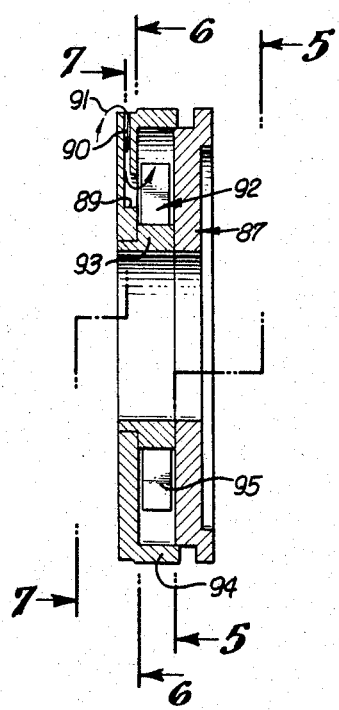
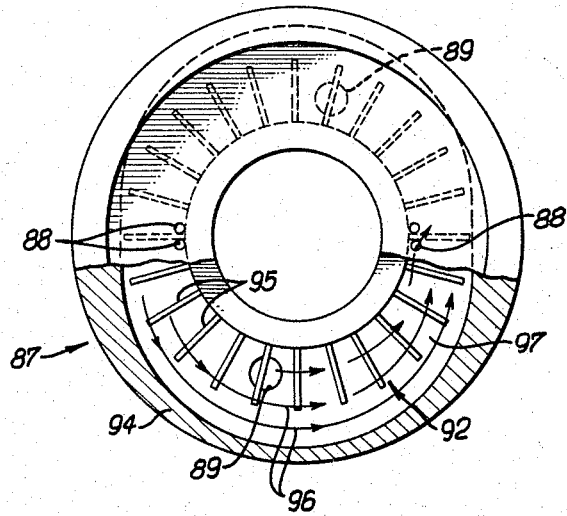
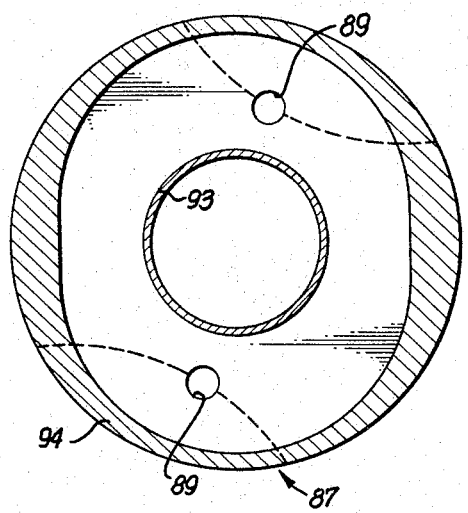
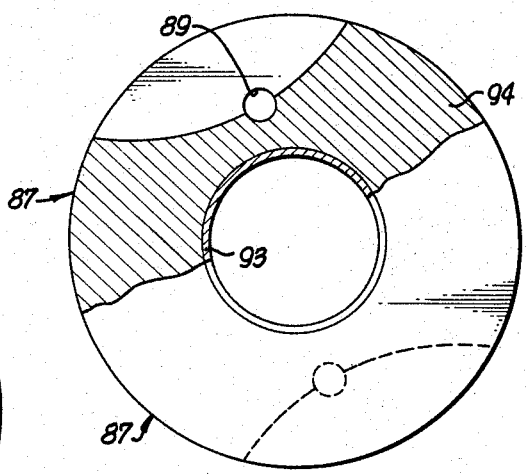

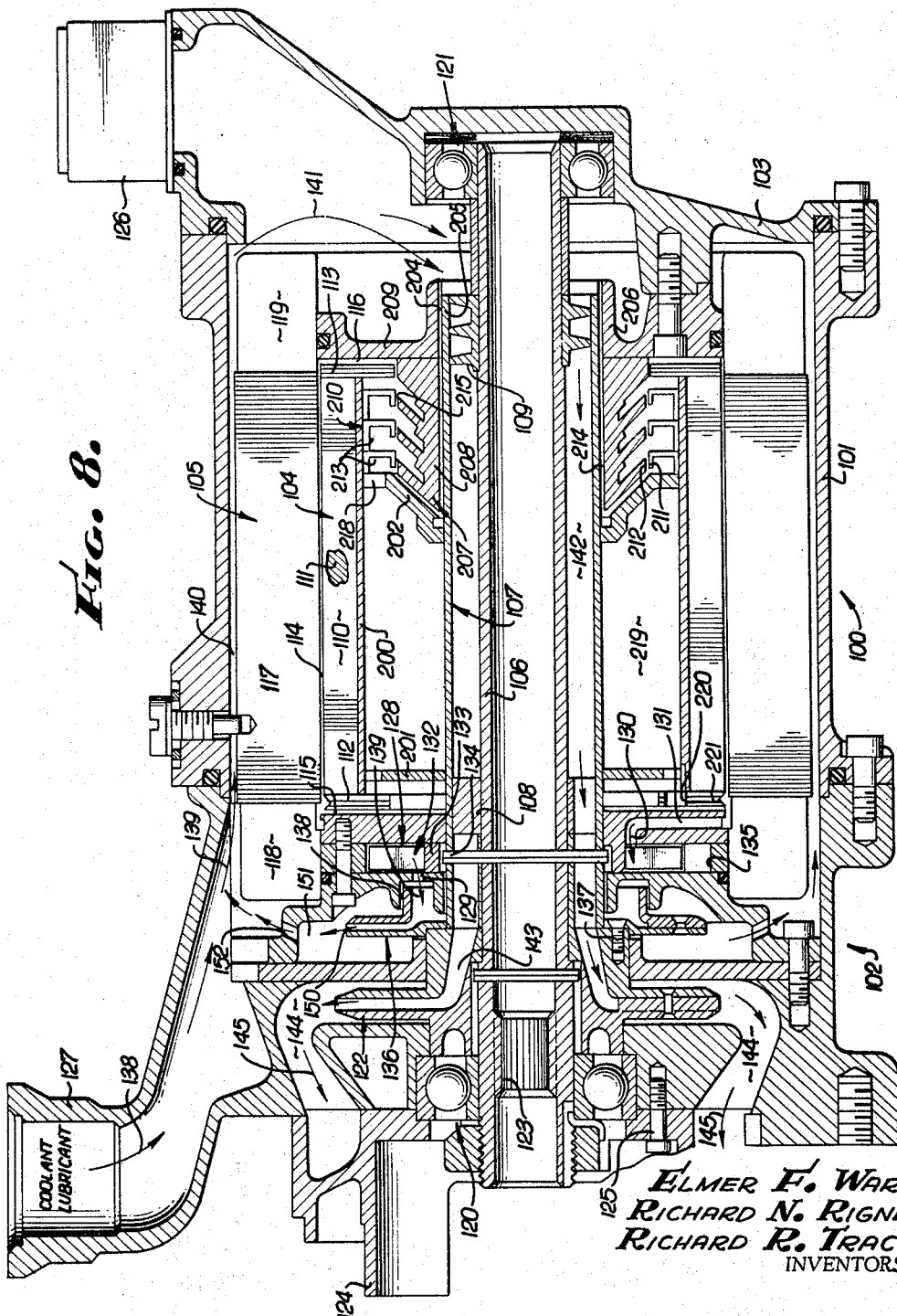

United States Patent Office 3,333,126
Patented July 25, 1967

3,333,126
INDUCED VAPORIZATION COOLING OF
ROTARY ELECTRICAL MACHINES
Elmer F. Ward, Orange, Richard N. Rigney, Anaheim, and Richard R. Tracy, Pasadena, Calif., assignors to Task Corporation, Anaheim, Calif., a corporation of California
Original application Jan. 7, 1963, Ser. No. 249,631, now Patent No. 3,294,991. Divided and this application May 27, 1966, Ser. No. 586,565
6 Claims. (Cl. 310—54)

This is a division of application Ser. No. 249,631, filed Jan. 7, 1963, now Patent No. 3,294,991.

This invention relates generally to electrical machinery, and more particularly has to do with decreasing the so called viscous friction drag exerted on rotor assemblies, and with promoting desirable cooling and lubrication of rotor and stator assemblies, particularly in instances where the latter are immersed in an oil or coolant bath.

Speaking generally with respect to the design and operation of high speed electrical machinery, it is found that their upper speed and load limits are governed by limitations of heat transfer from the stator and rotor assemblies. The inability to transfer heat from, or cool, the stator and particularly the rotor at sufficient rates causes excessive heating, so that rotor and stator temperatures must be controlled or kept below certain predetermined maxima so as to prevent burn-out of the motor. In conventional electric motors having coolant jackets surrounding the stator assemblies, these heat losses in the end turns of the stator winding must be transferred to the stator iron and then to the jacket, which is cooled by fluid circulation in confined spaced within the jacket. And, the rotor assembly normally can get rid of its heat only by transfer to the bearings or by radiation to the stator. Accordingly, speed and load limitations of high speed motors are primarily governed by heat transfer rates from the stator and rotor assemblies.

In U.S. Patent 3,043,968 entitled, "Fluid Cooled Electrical Machine," there are disclosed techniques for achieving more effective heat transfer from the rotor and stator, characterized in that coolant confined in the gap between the rotor and stator is subjected to vaporization primarily as a result of operating temperature increase. After coolant in the gap becomes vaporized, the rotor operates as if it were rotating in air, with very little skin friction or drag. In addition, utilization is made of the latent heat of vaporization of the coolant to absorb heat from the rotor while the fluid remains at the same temperature and vaporizes. Vapor bubbles then slowly discharge from the gap and into liquid within the motor housing but outside the gap, where the bubbles collapse and give up their latent heat to the circulating fluid. Such techniques typically require the use of special coolants such as volatile petroleum derivatives, typically gasoline, or the liquid known as FC-75.

The present invention permits an extension of the advantages discussed above in that a broader range of coolants become usable for the purpose of reducing skin friction or drag. As will be brought out, vaporization of coolant or lubricant in the gap is brought about not primarily as a result of temperature increase to a relative high operating temperature, say 400° F. but primarily as a result of a sufficient reduciton in pressure of the gap liquid that a vapor bubble or bubbles form. Typically, the pressure is dropped to the point where air dissolved in the coolant or lubricant comes out of solution to form the desired vapor bubble in the gap. Some or all of the liquid in the gap may also become vaporized at the reduced pressure conditions created therein.

In accordance with these new principles, it is a major object of the invention to provide in an electrical machine that includes rotor and stator assemblies having a gap therebetween, to which liquid has access, means for exerting suction tending to reduce the liquid pressure in the gap and to sufficient extent that a vapor zone forms therein during machine operation. Typically, the suction exerting means comprises at least one pump, and preferably two pumps having inlets communicating with the gap at axially opposite ends thereof, the inlets being characterized as located at the only point or points past which liquid may gain access to the gap.

As will be brought out, one desirable form of pump means serving these ends comprises peripheral grooving spiraling along and about the rotor shaft, the grooving communicating with the gap and typically being received within bore forming means such as a bushing acting as a shaft bearing. Two such pumps are desirably formed by grooving on shaft projections received within bushings at opposite ends of the rotor body, the bushings typically being supported by housing structure enclosing the rotor and stator assemblies, and in such relation to said structure that liquid lubricant has access to the gap only through the running clearances between the bushings and shaft projections on which the spiral grooves are formed. Also, as will be seen, another desirable form of pump means serving these ends comprises an impeller located in a chamber having an inlet communicating with the gap, the impeller circulating a ring of liquid in air suction relation with the chamber inlet and in air discharge relaton with the pump chamber outlet. Preferably, but not necessarily, a pair of chambers containing such impellers is provided with the chambers at axially opposite ends of the rotor assembly, each chamber having an air suction inlet connecting with the gap portion at the end of the rotary assembly.

Additional features of the invention includes the provision of a tubular shaft having an inlet near one bushing to receive intake circulation of coolant, and an outlet near an opposite end bushing to discharge lubricant or coolant that has circulated through the shaft and through the rotor body interior.

These and other objects and advantages of the invention, as well as the details of an illustrative embodiment, will be more fully understood from the following detailed description of the drawings, in which:

FIG. 3 is a side elevation taken in section through another motor incorporating the invention and showing the use of centrifugal displacement type pumps for applying suction to the gap;

FIG. 4, is an enlarged section showing a centrifugal displacement pump in detail;

FIG. 5 is a section taken on line 5—5 of FIG. 4;

FIG. 6 is a section taken on line 6—6 of FIG. 4;

FIG. 7 is a section taken on line 7—7 of FIG. 4; and

FIG. 8 is a side elevation taken in section through still another motor incorporating the invention.

Figure 1:
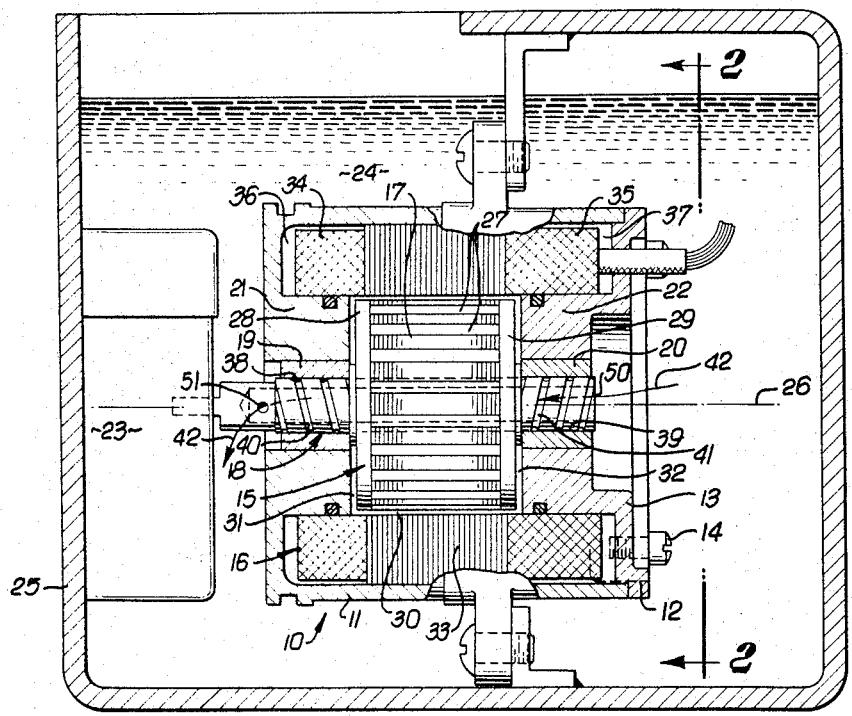
FIG. 1 is a side elevation, taken in section, showing a typical motor incorporating the invention.
Figure 2:
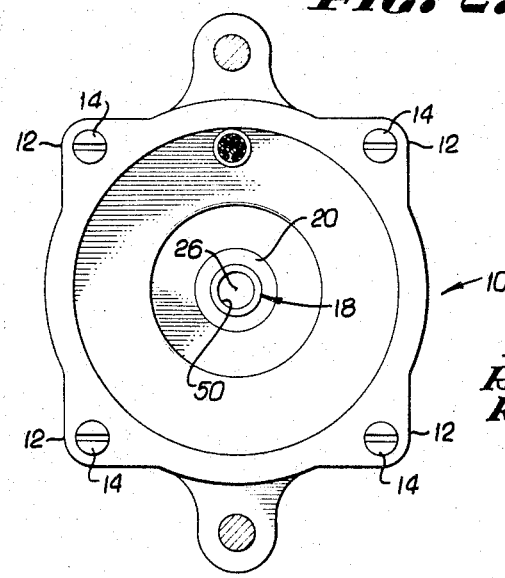
FIG. 2 is an end elevation taken on line 2—2 of FIG. 1.

In the FIGS. 1 and 2 drawings, a motor housing generally indicated at 10 includes a receptacle 11 having a flange 12 at one end thereof and a cap 13 closing the receptacle and being connected to the flange at 14. Contained within the housing 10 are rotor and stator assemblies generally indicated at 15 and 16 respectively. The rotor assembly includes a body 17 carried by the tubular rotor shaft 18 projecting at opposite ends of the body 17 as illustrated. The shaft projections are journaled in sleeve bearings or bushings 19 and 20, these being in turn supported by the annular housing bosses 21 and 22. The shaft 18 is typically connected in driving relation with equipment generally indicated at 23, and typically comprising a pump. Further, the motor housing is typically immersed within a coolant bath 24 contained with a vessel 25.

The rotor body 17 typically includes an iron core the packed laminations of which extend in planes perpendicular to the shaft axis 26. A series of circularly spaced conductor bars 27 are received or sunk in the core forming the squirrel cage associated with induction motors, there being annular end rings 28 and 29 at opposite ends of the body and joined with the conductor bars.

The stator 16 extends concentrically about the rotor to form a thin gap therebetween, the gap being ring shaped at 30 about the rotors bars 27, and being annular at the locations 31 and 32 adjacent the end faces of the rotor body. These gap portions 31 and 32 extend inwardly to the rotor shaft 18 and communicate therewith. The stator includes an elongated laminar core 33 containing openings, not shown, through which the stator windings extend in axial direction, the windings at opposite ends of the core being shown as rings 35 and 35. These rings extend generally in the annular spaces 36 and 37 outwardly of the bosses 21 and 22.

In accordance with the invention, means is provided for exerting suction tending to reduce liquid pressure in the gap and to sufficient extent that a vapor zone forms therein during machine operation. In this regard, it will be understood that the liquid 24 gains access to the gap including portions 30–32, typically through the running clearances at the locations 38 and 39 between the shaft projections and the bushings 19 and 20. One form of such suction exerting means comprises pumps having inlets communicating with the gap, and specifically portions 31 and 32 thereof, the pumps being located at the points or clearances past which liquid gaining access to the gap must pass.

Such pumps are typically formed by shaft peripheral grooving spiraling at 40 and 41 about the shaft axis 26 and along the shaft projections within the bushings 19 and 20, these grooves respectively communicating with the gap portions 31 and 32 as shown. Accordingly, a pumping effect is created during shaft rotation in the direction of the arrow 42, tending to reduce liquid pressure in the gap and to sufficient extent that a vapor zone forms therein. As previously mentioned in the introduction, the pressure reduction may be such that air dissolved in the liquid 24 comes out of solution and forms into a bubble substantially filling the gap. Also, it is possible for the liquid itself to vaporize at the reduced pressure within the gap. Accordingly, the rotor body 17 the periphery of which has relatively high speed due to the enlargement thereof relative to the shaft diameter, is subjected to substantially reduced drag as compared with conditions where liquid fills the gap, since the skin friction associated with the vapor in the gap is minimal. This effect is of substantial importance at high rotor speeds as for example in excess of 10,000 r.p.m. Since vaporization is achieved primarily by pressure reduction it is not primarily dependent upon temperature increase, whereby many liquid coolants including different light oils become usable, as compared with the relatively restricted range of coolants which are usable where vaporization is primarily achieved through temperature increase. The importance of this advantage may be seen when it is realized that the motor may now be immersed in a wide variety of baths 24, thereby extending its utility to applications previously not thought to be feasible.

As previously mentioned the shaft 18 is tubular. To promote cooling of the rotor, the shaft has an inlet 50 at one end thereof and near the bushings 20 to receive intake circulation of lubricant, there being an outlet 51 proximate the opposite end of the shaft and near the bushing 19 to discharge lubricant that has circulated through the shaft and through the rotor body. Typically the outlet 51 comprises an opening drilled through the side of the shaft, thereby to act as a slinger for drawing lubricant outwardly by centrifugal action to induce the desired circulation.

Turning now to FIGS. 3 through 7, a motor housing generally indicated at 50 includes a shell 51 and end caps or structures 52 and 53 connected to opposite ends of the shell. Contained within the housing 50 are rotor and stator assemblies generally indicated at 54 and 55 respectively. The rotor assembly includes a tubular shaft 56, a concentric tubular body 57 mounted on the shaft as by means of the structure indicated at 58 and 59, and an iron core the packed laminations 60 of which extend in planes perpendicular to the shaft axis. A series of circularly spaced conductor bars 61 is received or sunk in the core forming the squirrel cage typically associated with induction motors, annular end rings 62 and 63 being provided at opposite ends of the body core and joining with the conductor bars.

The stator 55 extends concentrically about the rotor to form a thin gap therebetween, the gap portion 64 being ring shaped about the rotor core. The gap also includes annular portions at the locations 65 and 66 adjacent the end faces of the rotor body and specifically the rotor end rings 62 and 63. Finally, the stator includes an elongated laminated core 67 containing openings, not shown, through which the stator windings extend, the windings at opposite ends of the core 67 being shown as rings 68 and 69.

Returning to the rotor assembly, the shaft 56 is typically journaled by anti-friction bearing assemblies generally indicated at 70 and 71, the outer rings of which are suitably supported directly or indirectly by the housing structure. Also, the shaft 56 is typically connected in driving relation with equipment which includes a lubricant or coolant pump impeller shown generally at 72, and also another pump or item of equipment not shown. As to the latter, the connection of the shaft thereto may be by means of a spline drive indicated at 73. The driven pump housing fits the annular adapter structure 74 connected at 75 to housing end structure 52.

FIG. 3 shows the housing 50 supporting an electrical connection 76 through which suitable wiring may extend to supply electrical current to the motor. The housing also carries a lubricant or coolant inlet 77, the arrow 78 indicating the path of liquid flowing into the housing. The arrow 79 shows the liquid path of flow between the stator and the housing through a suitable passage 80, the liquid then flowing generally inwardly as indicated by the arrow 81 and toward the rotor at the opposite end of the assembly. The liquid is then drawn into the tubular passage 82 between the rotor shaft 56 and body 57 by a suitable means such as an axial flow impeller 59 also acting to support one end of the rotor body 57 on the rotor shaft. Thereafter, the liquid within the passage 82 flows leftwardly and enters the discharge passages 83 formed by the impeller 72. As a consequence, the rotor driven impeller 72 slings the liquid outwardly to flow through a discharge passage 84 formed in the housing end structure 52, the arrow 85 indicating the liquid exit path. It will be understood that the liquid then recirculates to the entrance inlet 77, a suitable reservoir being typically interposed for collecting liquid prior to recirculation thereof to the inlet.

In accordance with the invention, the pump means shown for exerting suction tending to reduce liquid pressure in the gap, and to the extent that a vapor zone forms therein during machine operation, includes a pair of chambers 86 and 87 respectively located at axially opposite ends of the rotor assembly. Referring to the chamber 87 illustrated in detail in FIGS. 4 through 7, it has diametrically opposed outlets 88, as well as diametrically opposed suction inlets 89 communicating with the gap portion 66, as for example through the ducts 90. The latter are so arranged that air may be drawn by suction in the direction indicated by the arrows 91 in FIG. 4 and through the inlets 89 to ultimately discharge through the outlets 88.

The pump means also includes a rotor assembly driven impeller 92 located in each chamber 86 and 87 for circulating a ring of liquid in suction relation with the chamber inlets 89 and in air discharge relation with the chamber outlets 88. The impeller may be mounted as at 93 in FIG. 3 upon the rotor body 57 for rotation therewith. FIGS. 5 and 6 show the chamber 87 to have a generally elliptical casing 94 which in operation is partially filled with liquid. The impeller revolving at high speed tends to throw the liquid outwardly by centrifugal force, forming a ring of liquid traveling in the casing generally with the rotor but following the elliptical shape of the casing. Accordingly, the liquid is caused to move inwardly and outwardly with respect to the spaces or passages between the impeller means 95, typically twice in each revolution. This functioning is illustrated by the liquid flow path arrows 96 in FIG. 5. Such arrows show the liquid traveling outwardly of an air inlet 89, whereby air or other vapor from the gaps 64–68 is drawn into the zones formed by the liquid and the inner portions of the impeller plates or vanes. As the impeller continues to turn, the liquid is directed inwardly by the casing in the region 97 which causes the trapped air to become compressed in the passages between the impeller plates, so that when these passages pass over the outlets 88 the pressurized air escapes to the exterior. Due to the arrangement of the inlets and outlets, the suction and discharge cycle occurs twice during each revolution of the impeller.

Referring back to FIG. 3, it will be noted that air and any excess liquid escaping from the chamber 87 are carried into the main stream of coolant circulating through the motor for ultimate exit therefrom. This is indicated by the arrow 98 as respects the chamber 87, and by the arrows 99 as respects the chamber 86. Accordingly, the discharge of the pump means described communicates with the path of liquid travel through the motor assembly and exteriorly of the gap between the rotor and stator assemblies. Accordingly, the device requires no seals for the close fits between the relatively rotating parts. Oil or other liquid coolant seeping into the gap between the rotor and stator assemblies is subjected to suction when the motor is started, and conditions are quickly reached under which the pressure in the gap is reduced to the extent that a vapor zone forms therein during machine operation. The vapor bubble tending to form in the gap gives the desired results previously referred to.

Referring now to FIGURE 8, the general configuration is much like that seen in FIGS. 3–7. A motor housing generally indicated at 100 includes a shell 101 and end caps or structures 102 and 103 connected to opposite ends of the shell. Contained within the housing 100 are rotor and stator assemblies generally indicated at 104 and 105 respectively. The rotor assembly includes a tubular shaft 106, a concentric tubular body 107 mounted on the shaft as by means of the structure indicated at 108 and 109, and an iron core, the packed laminations 110 of which extend in planes perpendicular to the shaft axis. A series of circularly spaced conductor bars 111 is received or sunk in the core forming the squirrel cage typically associated with induction motors, annular end rings 112 and 113 being provided at opposite ends of the body core and joining with the conductor bars. Laminations 110 are carried by a hollow tubular mount 200 supported by annular inserts 201 and 202 on body 107.

The stator 105 extends concentrically about the rotor to form a thin gap therebetween, the gap portion 114 being ring shaped about the rotor core. The gap also includes annular portions at the locations 115 and 116 adjacent the end faces of the rotor body. Finally, the stator includes an elongated laminated core 117 containing openings, not shown, through which the stator windings extend, the windings at opposite end of the core 117 being shown as rings 118 and 119.

Returning to the rotor assembly, the shaft 106 is typically journaled by anti-friction bearing assemblies generally indicated at 120 and 121, the outer rings of which are suitably supported directly or indirectly by the housing structure. Also, the shaft 106 is typically connected in driving relation with equipment which includes a lubricant or coolant pump impeller shown generally at 122, and also another pump or item of equipment not shown. As to the latter, the connection of the shaft thereto may be by means of a spline drive indicated at 123. The driven pump housing fits the annular adapter structure 124 connected at 125 to housing end structure 102.

The housing 100 supporting an electrical connection 126 through which suitable wiring may extend to supply electrical current to the motor, and the housing also carries a lubricant or coolant inlet 127, the arrow 138 indicating the path of liquid flowing into the housing. The arrow 139 shows the liquid path of flow between the stator and the housing through a suitable passage 140, the liquid then flowing generally inwardly as indicated by the arrow 141 and toward the rotor at the opposite end of the assembly. The liquid is then drawn into the tubular passage 142 between the rotor shaft 106 and body 107 by a suitable means such as an axial flow impeller 109 also acting to support one end of the rotor body 107 on the rotor shaft. Thereafter, the liquid within the passage 142 flows leftwardly and enters the discharge passages 143 formed by the impeller 122. As a consequence, the rotor driven impeller 122 slings the liquid outwardly to flow through a discharge passage 144 formed in the housing end structure 102, the arrow 145 indicating the liquid exit path. It will be understood that the liquid then recirculates to the entrance inlet 127, a suitable reservoir being typically interposed for collecting liquid prior to recirculation thereof to the inlet.

In accordance with this form of the invention, pump means is provided for exerting suction tending to reduce liquid pressure in the gap, and to the extent that a vapor zone forms therein during machine operation, such means including a chamber having diametrically opposed outlets 129 as well as diametrically opposed suction inlets 130 communicating with the outward extent of the gap between the rotor and stator. Duct portions 131 of the inlets 130 so arranged that air may be drawn by suction in the radially inward direction to the inlets 130, ultimately to discharge through the outlets 129. The inlets 130 and outlets 129 actually are angled about 90° about the housing axis with respect to each other, as are inlets 88 and outlets 89 in FIG. 5.

The pump means also includes a rotor assembly driven impeller 132 located in chamber 128 for circulatnig a ring of liquid in suction relation with chamber inlets 130 and in air discharge relation with the chamber outlets 129. The impeller may be mounted as at 133 and pinned at 134 upon the rotor body 107 for rotation therewith. As in FIGS. 5 and 6, the chamber 128 has a generally elliptical casing 135 which in operation is partially filled with liquid. The impeller revolving at high speed tends to throw the liquid outwardly by centrifugal force, forming a ring of liquid traveling in the casing generally with the rotor but following the elliptical shape of the casing. Accordingly, the liquid is caused to move inwardly and outwardly with respect to ths spaces or passages between the impeller means 132, typically twice in each revolution. The liquid travels outwardly of the air inlets 130, whereby air or other vapor from the gaps 114–116 is drawn into the zones formed by the liquid and the inner portions of the impeller plates or vanes. As the impeller continues to turn, the liquid is directed inwardly by the casing, which causes the trapped air to become compressed in the passages between the impeller plates, so that when these passages pass over the outlets 129 the pressurized air escapes to the exterior of chamber 128. Due to the arrangement of the inlets and outlets, the suction and discharge cycle occurs twice during each revolution of the impeller.

In this form of the invention, the pump means also includes an auxiliary stage as represented by centrifugal impeller 136 fastened at 137 to the rotor structure as represented by impeller 122 to rotate therewith, and having a running fit with the housing structure at 138. The auxiliary pumping stage has an annular inlet at 139 receiving the discharge from the outlets 129, and an outlet discharging at 150 into the chamber 151. Such discharge then flows through suitable ports 152 to merge with the general flow of lubricant-coolant indicated at 139.

In operation, it is found that the auxiliary pumping stage as represented by impeller 136 aids the functioning of impeller 132, improving its performance in removing air from the gaps 114–116 and creating vapor conditions therein, particularly where substantial liquid coolant pressure conditions exist in the housing, as for example at points 151 and 139. Such pressure is necessary in order to create flow of lubricant-coolant through the equipment as described.

FIG. 8 also shows that at least one of the rotor and stator assemblies includes structure forming a labyrinth passage in the flow path of liquid access to the gaps from the exterior thereof. For example, such exterior circulating liquid tends typically to gain leaking access to the gap through seal clearance, the cylindrical seal 204 being inserted between rotor and stator tubular extents 205 and 206. Labyrinth forming structure is generally indicated at 207 as integral with at least one of the rotor and stator assemblies. Thus, portion 208 of the labyrinth structure is integral with the stator part 209 and portion 210 is integral with the rotor part 200.

Lips 211 and 212 of the labyrinth structure form a pocketed labyrinth passage 213 wherein liquid leaking past seal 204 and through clearance 214 becomes trapped before gaining access to the gap 116. The passage 213 includes slight clearances 215 between the terminals of the rotary and non-rotary lips 211 and 212, to further restrict leakage access to the gap.

Rotation of the outer labyrinth structure 210 tends to throw the leaking liquid outward away from the slight clearances 215, whereby the centrifuged liquid tends to escape through by-pass outlets 218 in rotor part 202 to the interior 219 of the rotor. Such escaping or by-passed liquid is drawn to the intake duct 131 of pump inlet 130 via passages 220 and 221 in the rotor assembly, whereby leaking liquid by-passes the gap 114 in flowing to the pump inlet. As a result, the pressure in the gap may be kept at a minimum for highly efficient motor operation. At the same time, the liquid passing through the rotor interior 219 is centrifuged against and in cooling relation with the tubular mount 200 for the rotor laminations.

We claim:

1. In an electrical machine that includes coaxial rotor and stator assemblies having a gap therebetween to which liquid lubricant has access, the rotor having a body and a rotor shaft projecting at axially opposite ends of said body, the improvement that comprises shaft peripheral grooving spiraling along and about the shaft axis and communicating with said gap, and bore forming means receiving grooved extent of the shaft, said access being had at clearance between said shaft and said bore forming means prior to rotation of said shaft, whereby upon rotation of said rotor assembly including said shaft a pumping effect is created tending to reduce liquid pressure in the gap and to sufficient extent that a vapor zone forms in the gap.

2. The invention as defined in claim 1 in which grooving includes spiral grooves formed in said shaft projections and respectively communicating with the gap at axially opposite end faces of the rotor body.

3. The invention as defined in claim 2 in which said bore forming means comprises bushings supporting said shaft projections at opposite ends of said rotor body.

4. The invention as defined in claim 3 wherein said bushings are supported to be freely accessible to a liquid lubricant bath at the housing exterior.

5. The invention as defined in claim 3 in which said shaft is tubular, has an inlet near one bushing to receive intake circulation of lubricant, and has an outlet near another bushing to discharge lubricant that has circulated through the shaft and through said rotor body.

6. The invention as defined in claim 4 including a vessel containing said liquid lubricant in which said housing is submerged, said lubricant containing dissolved air.

No references cited.

MILTON O. HIRSHFIELD, *Primary Examiner.*

L. L. SMITH, *Assistant Examiner.*